(12) United States Patent
Sengupta (10) Patent No.: US 7,940,929 B1
(45) Date of Patent: May 10, 2011

(54) METHOD FOR PROCESSING DOCUMENTS CONTAINING RESTRICTED INFORMATION

(75) Inventor: Arijit Sengupta, Jamaica Plain, MA (US)

(73) Assignee: BeyondCore, Inc., San Mateo, CA (US)

( * ) Notice: Subject to any disclaimer, the term of this patent is extended or adjusted under 35 U.S.C. 154(b) by 1093 days.

(21) Appl. No.: 11/286,080

(22) Filed: Nov. 23, 2005

(51) Int. Cl.
*G09C 3/08* (2006.01)

(52) U.S. Cl. .................. 380/51; 726/1; 726/2; 715/209; 715/234; 715/242; 715/253; 715/277

(58) Field of Classification Search .................. 713/1, 2, 713/188, 194; 380/200, 201, 255, 277, 51; 726/2, 1; 715/209, 234, 242, 253, 277
See application file for complete search history.

(56) References Cited

U.S. PATENT DOCUMENTS

| | | | |
|---|---|---|---|
| 5,101,493 A * | 3/1992 | Travis et al. ...................... 707/1 |
| 5,181,162 A * | 1/1993 | Smith et al. ..................... 715/209 |
| 5,631,984 A * | 5/1997 | Graf et al. ...................... 382/317 |
| 5,999,664 A * | 12/1999 | Mahoney et al. ............. 382/305 |
| 6,266,683 B1 * | 7/2001 | Yehuda et al. ................. 715/234 |
| 6,665,841 B1 * | 12/2003 | Mahoney et al. ............. 715/204 |
| 7,149,347 B1 * | 12/2006 | Wnek .......................... 382/159 |
| 7,191,252 B2 * | 3/2007 | Redlich et al. ................ 709/246 |
| 7,272,857 B1 * | 9/2007 | Everhart ......................... 726/26 |
| 7,313,825 B2 * | 12/2007 | Redlich et al. .................. 726/27 |
| 7,322,047 B2 * | 1/2008 | Redlich et al. .................. 726/27 |
| 2002/0059539 A1 * | 5/2002 | Anderson ......................... 714/6 |
| 2003/0101416 A1 * | 5/2003 | McInnes et al. .............. 715/513 |
| 2003/0120578 A1 * | 6/2003 | Newman ......................... 705/36 |
| 2006/0075228 A1 * | 4/2006 | Black et al. .................... 713/167 |
| 2006/0130154 A1 * | 6/2006 | Lam et al. ....................... 726/30 |
| 2007/0067242 A1 * | 3/2007 | Lotspiech et al. ............. 705/57 |
| 2007/0174637 A1 * | 7/2007 | Lotspiech et al. ............. 713/190 |
| 2008/0134101 A1 * | 6/2008 | Newman ....................... 715/856 |
| 2008/0141117 A1 * | 6/2008 | King et al. .................... 715/238 |

* cited by examiner

*Primary Examiner* — Philip J Chea
*Assistant Examiner* — Joseph Pan
(74) *Attorney, Agent, or Firm* — Fenwick & West LLP (57) ABSTRACT

A method, system and computer program product for processing documents containing restricted information. The method for processing the documents includes the step of identifying data fields in the document. The method further includes the steps of identifying a critical section containing data fields corresponding to restricted information, and dividing the document into a critical section and a non-critical section. Further, the method includes the step of processing the non-critical section at a minimally secure location.

43 Claims, 8 Drawing Sheets

METHOD FOR PROCESSING DOCUMENTS CONTAINING RESTRICTED INFORMATION

BACKGROUND

The present invention relates to the field of processing documents containing restricted information. Specifically, the present invention relates to the field of protecting restricted information in a document, while processing the document at a minimally secure location.

Many organizations in European Union (EU) countries and the US have started outsourcing their data processing and data-entry operations to other organizations, which may be located in the EU and the US or at offshore locations such as India, China, Russia and Brazil.

Outsourcing operations relating to data processing and data entry may involve the transfer of documents containing restricted information. Restricted information is defined as information that cannot be disclosed to an unauthorized organization or to one or more individuals. Restrictions on the disclosure of restricted information may be based on customer-specific, contract-specific or regulation-specific requirements, or in accordance with industry best practices.

Restricted information includes personally identifiable information that can be used to identify an individual. Personally identifiable information is protected by various Federal and European privacy regulations, which prohibit the transfer of personal information to a foreign country. Due to these regulations, documents containing restricted information relating to an individual cannot be transferred out of the country for data-processing and data-entry operations. Hence, many organizations cannot outsource the data-processing operations of documents containing restricted information. Examples of personally identifiable information include, but are not limited to, names, phone numbers, e-mail addresses, Social Security Numbers (SSNs), driving license numbers, ethnicity, religion, and combinations thereof. Restricted information may also include information such as Internet Protocol (IP) addresses that may be used to locate individuals.

Other examples of restricted information include the financial data of companies, business transaction records, medical records of individuals, and so forth. The disclosure of such restricted information may result in financial or commercial loss to a company and loss of competitive advantage.

A document may include several data fields that may individually or collectively correspond to restricted information. For instance, data fields such as a SSN or a phone number, a credit card number, and so forth, individually correspond to the restricted information. Therefore, such data fields cannot be individually disclosed to a minimally secure entity.

Further, data fields such as the name and address of an individual collectively correspond to restricted information. Therefore, such data fields cannot be collectively disclosed to a minimally secure entity. However, they can be individually disclosed to the minimally secure entity.

The minimally secure entity may be an organization or one or more individuals in an organization, who are not allowed access to the restricted information.

Various methods are available for processing documents containing restricted information. These methods are based on disguise and encryption of data fields corresponding to restricted information in documents. Disguise operations can be implemented to protect mathematical and computational data in documents. However, they cannot be widely or commonly used to protect textual data in the documents. Encryption can be used to protect textual as well as mathematical and computational data in documents. Encrypted documents can be transferred to different locations for data-processing operations. However, these documents have to be decrypted before they can be processed. A minimally secure entity, performing data processing operations has access to the decryption code(s) for decrypting encrypted documents. Therefore, methods based on encryption do not allow the transfer of documents containing restricted information to a minimally secure entity that cannot be trusted with restricted information. In addition, the methods do not provide protection for restricted information in a situation wherein the encryption fails during the transfer of documents, or in a situation wherein the minimally secure entity's infrastructure is hacked by a malicious third party.

Therefore, there is a need for a method, which allows processing of maximum content in documents containing restricted information, with a minimal security risk involved during the processing of the documents. Further, there is a need for a method to protect the restricted information from a minimally secure entity that cannot be trusted with it. There is also a need for a method that is effective in protecting the restricted information, even if the minimally secure entity's infrastructure is hacked by a malicious third party. In addition, there is a need for a method that can be used to incorporate and automatically enforce the information sharing restrictions on documents containing restricted information.

SUMMARY

An object of the present invention is to provide a method for processing one or more documents or parts of one or more documents containing restricted information, without transferring the restricted information to a minimally secure entity.

Another object of the present invention is to provide a method for protecting restricted information in a document, while maximizing the subset of the document, which can be safely transferred for processing to a minimally secure entity.

A further object of the present invention is to provide a method for protecting the restricted information, while the document is being processed by a minimally secure entity, in a situation wherein the minimally secure entity's infrastructure is hacked by a malicious third party.

Another object of the present invention is to provide a method for protecting the restricted information while the document is being processed by less trusted in-house employees (for example, new or temporary employees).

A yet another object of the present invention is to provide a method that can be used to incorporate and automatically enforce the information sharing restrictions on documents containing restricted information.

Various embodiments of the present invention provide a method, system and computer program product for processing documents containing restricted information. The method for processing the documents includes the step of identifying the various data fields in each document.

The method also includes the step of identifying a critical section in each document. This critical section includes the minimum number of data fields corresponding to the restricted information. Further, the document is divided into a critical section and a non-critical section. Thereafter, the non-critical section is processed at the minimally secure location.

In various embodiments of the invention, information that can be safely transferred to a minimally secure entity can be maximized by determining a maximal subset of fields, wherein (i) the fields that need to be kept together for processing are treated as one entity and kept together either in the individually critical section or in the collectively critical section or in the non-critical section, (ii) at least one field in the combination of fields, which collectively correspond to restricted information, is not included, and (iii) any field that individually corresponds to restricted information is not included. This determined maximal subset of fields represents the maximum information that can be safely transferred to a minimally secure entity. The maximal subset of fields can be further optimized by taking into consideration the relative weights assigned to each field. For example, different fields may be assigned a weight, based on the labor involved in processing each field. In this case, the maximal subset of fields represents the set of fields that does not contain restricted information and is the most labor-intensive to process. In various embodiments of the invention, different fields can be assigned a weight, based on the time, cost, and outsourcing risk involved in processing each field, and so forth. The maximal subset can be calculated using any standard constraint solving/optimizing algorithm.

The system for processing documents containing restricted information includes various modules that carry out the method of the invention in accordance with the various embodiments. A data field-identifying module identifies the different data fields in one or more documents. A critical section-identifying module identifies the critical section, which includes the minimum number of data fields corresponding to the restricted information in each document. A document-dividing module divides each document into a critical and non-critical section. A transmitting module transmits the non-critical section to a minimally secure location for processing.

BRIEF DESCRIPTION OF THE DRAWINGS

Various embodiments of the invention will hereinafter be described in conjunction with the appended drawings, provided to illustrate and not to limit the invention, wherein like designations denote like elements, and in which.

DESCRIPTION OF VARIOUS EMBODIMENTS

Various embodiments of the present invention relate to the processing of one or more documents containing restricted information. Further, the embodiments of the present invention provide methods and systems for protecting restricted information in a document while the document is being processed by a minimally secure entity. Processing documents includes, but is not limited to, data entry, data transfer, data storage, data reporting, and data transformation. The minimally secure entity comprises an organization or one or more individuals in an organization, who are not allowed access to the restricted information. In an embodiment of the invention, the minimally secure location can be geographically separate from the source location of the document. For example, the source location may be in the USA, while the minimally secure location may be in India.

It is to be noted that while the examples in the description section primarily refer to document processing, the same methodologies can be applied to document storage. For example, the method of the present invention may be used in a situation where a company may want to store the maximum amount of its data at a less secure but cheaper location, while keeping the restricted information at a more secure location. According to various embodiments of the present invention a document may be a single document or a set of one or more documents that comprise restricted information.

Figure 1:
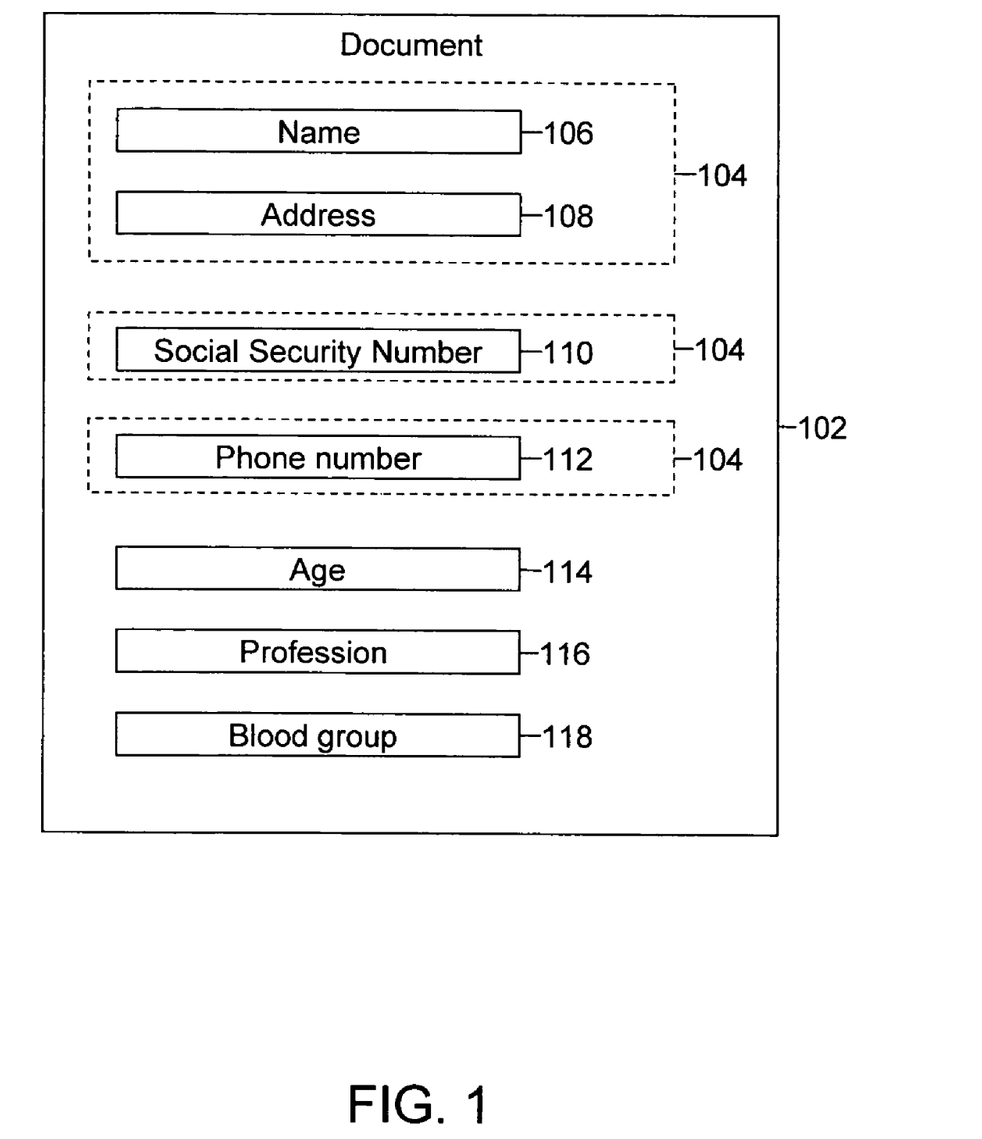
FIG. 1 is a block diagram depicting an exemplary document, in accordance with an embodiment of the present invention.

FIG. 1 is a block diagram depicting an exemplary document 102, in accordance with an embodiment of the present invention. According to various embodiments of the present invention, document 102 includes personal information relating to an individual, which may be provided by using various data fields. Examples of data fields may include name 106, address 108, Social Security Number (SSN) 110, phone number 112, age 114, profession 116, and blood group 118.

Some of the data fields in document 102 may correspond to restricted information 104. In various embodiments of the present invention, restricted information 104 includes information protected by various Federal and European privacy laws. According to these laws, restricted information cannot be transferred to a foreign location. Hence, restricted information 104 includes information that can be directly used to identify or trace an individual. For example, data fields such as SSN 110 or phone number 112 may individually correspond to restricted information 104. Data fields such as name 106 may not individually correspond to restricted information 104 in document 102. However, name 106 and address 108 may collectively correspond to restricted information 104 in document 102.

Further, some of the data fields in document 102 may correspond to non-restricted information. For example, data fields such as age 114, profession 116, and blood group 118 may correspond to non-restricted information.

Since document 102 contains data fields corresponding to restricted information 104, the document 102 should not be disclosed to the minimally secure entity. Therefore, in the current state-of-the-art technology, document 102 cannot be transferred to the minimally secure entity for processing.

Examples of restricted information may also include, but need not be limited to, information pertaining to financial data, medical records, business transactions, proprietary information (information protected by an individual or an organization to maintain confidentiality), information protected by contractual requirements, information protected by information safety requirements, and so forth.

Figure 2:
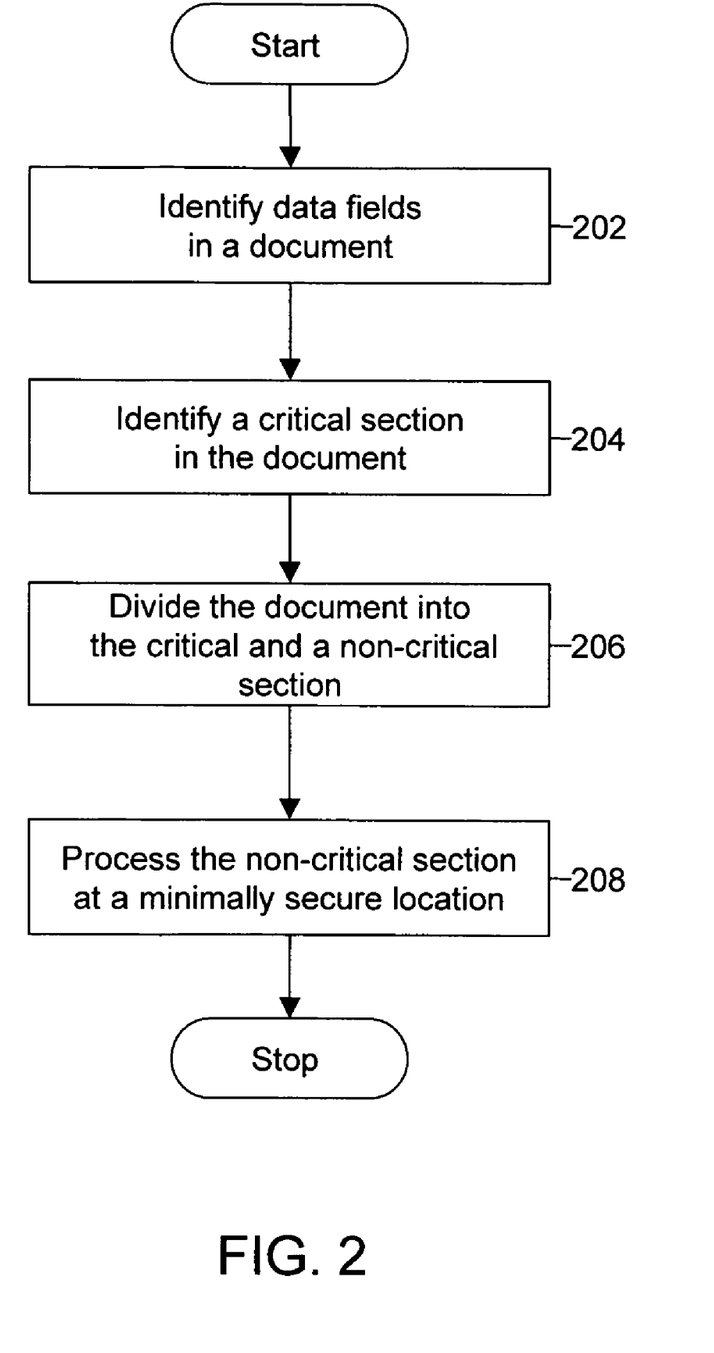
FIG. 2 is a flowchart depicting a method for processing one or more documents, in accordance with an embodiment of the present invention.

FIG. 2 is a flowchart depicting a method for processing one or more documents, in accordance with an embodiment of the present invention.

According to various embodiments of the present invention, each document may include restricted information relating to an individual. At step 202, the data fields in a document are identified. For example, referring to FIG. 1, data fields such as name 106, address 108, SSN 110, phone number 112, age 114, profession 116, and blood group 118 are identified in document 102. The data fields may be identified in several ways. For example, in an embodiment of the invention, each data field may consist of a data field name tag and a data field value tag. The data field tags may be compared to a library of equivalent tags. For example, tags named "lname" or "surname" may be mapped to a normative tag "last name." In other embodiments of the invention, specific values assigned to tags may also be considered. For example, if a tag is named "g" but the only values observed for the tag are "male" and "female", then the tag "g" may be mapped to a normative tag "gender". In various embodiments of the invention, a user may manually map the user specific tags to the normative tags. More advanced techniques arising out of the data integration domain may also be used to achieve the same result.

Thereafter, at step 204, a critical section in document 102 is identified. According to various embodiments, the critical section includes the minimum subset of data fields corresponding to restricted information 104. For example, referring to FIG. 1, SSN 110 and phone number 112 individually correspond to restricted information 104. Similarly, name 106 and address 108 collectively correspond to restricted information 104. Therefore, the critical section of document 102 may include one or more data fields, such as name 106 and address 108, SSN 110 and phone number 112. The critical section in document 102 is identified using a method for maximizing the information that can be safely transferred to a minimally secure entity for processing. The method is based on certain rules that may be defined by a user and/or built-in rules based on appropriate regulations, and industry best practices. This method is further elaborated on in FIG. 6.

At step 206, document 102 is divided into a critical section and a non-critical section. The non-critical section includes data fields that correspond to non-restricted information. For example, referring to FIG. 1, age 114, profession 116, and blood group 118 correspond to non-restricted information. Therefore, the non-critical section of document 102 may include one or more data fields such as age 114, profession 116, and blood group 118.

In various embodiments of the invention, certain data fields have to be kept together for processing. Such data fields are kept together in either the critical section or the non-critical section. For example, in a data processing operation where the taxable income of individuals has to be computed, the fields that relate to the different sources of an individual's income need to be kept together for processing. However, one or more of such data fields may correspond to restricted information. Therefore the set of data fields that relate to the different sources of an individual's income are treated as one segment or one entity and are included in the same critical section.

In an embodiment, document 102 is divided into a critical section and a non-critical section, using an appropriate computational algorithm selected from the group of graphical manipulation algorithms, text manipulation algorithms, audio manipulation algorithms and any other computational algorithm that is compatible with the format of the document. For example, the document may comprise audio signals, electromagnetic signals and so forth. Accordingly, the appropriate computational algorithm for dividing such documents may be an algorithm that can manipulate audio signals, electromagnetic signals and so forth.

Different computational tools are available for automatic manipulation of information stored as text or images. For example, direct digitization of textual documents can be carried out by using a mark-up language such as the Standard Generalized Mark-up Language (SGML). SGML documents have a consistency that facilitates automated manipulation of scanned documents, and they can be reused in different applications (such as paper publishing, databases, etc.) by using tools based on pattern recognition and rule-based manipulation. Thereby, scanned documents can be manipulated to remove fields containing restricted information.

Further, the data can be stored in the databases and retrieved by using structured query language (SQL). Moreover, integrations can be automated by using batch files, scripts, and SQL stored procedures. The data can be stored in a structured format, and only the required information can be retrieved, without the original stored data being affected. Consequently, non-critical information can be selectively retrieved from scanned documents.

Manipulation of information stored as images is enabled with various software applications such as Adobe Photoshop 7™, Auto Imager™, etc. In other embodiments of the invention, computational tools that are capable of masking certain information in a document can also be used. For example, in a document comprising an X-ray picture and a corresponding data-label, the data-label may comprise fields such as a person's name, SSN, address, birth-date and so forth. In such documents, the critical section comprises fields that correspond to restricted information such as the person's SSN and address. The non-critical section of such documents may comprise the X-ray image and fields, such as name and birth-date in the data label. The critical section of such document may be masked using computational tools for image manipulation. In such embodiments, documents with masked critical sections are provided to the minimally secure entity for data processing operations such as X-ray interpretation In various embodiments, a software code can be used for optical masking of the document. The masking algorithm can be used to mask the critical sections. The software code for optical masking of documents may be based on a pre-defined template document. The software code compares the document(s) to be masked with the template document, to confirm the orientation and size of the document to be masked. The software code may then apply different techniques to identify critical fields and conduct masking operations on the fields of the documents. An example of such a technique may be the field identification technique that is a part of the Optical Character Recognition (OCR) technique.

In an embodiment of the present invention, the different fields to be masked are predefined, based on the template document. For example, in the template document, the data field SSN 110 may appear on the upper left corner. If SSN 110 is a critical field, the software code will mask the corresponding upper left corner of all the documents (after considering zooming and orientation) that are to be transferred to a minimally secure entity for processing. The masking activity may be carried out in various ways, such as drawing a black rectangle over the area corresponding to a critical field.

Various embodiments of the present invention allow software systems to incorporate and automatically enforce pre-defined information sharing restrictions. The information-sharing restrictions may be pre-defined by competent authorities. For example, software systems can be tailored to identify the critical section of documents comprising fields that correspond to restricted information according to privacy regulations. Such software systems can be used to automatically enforce the information sharing restrictions on any document. This eliminates the need for user(s) of such software systems to analyze and interpret the specifications of privacy regulations. Further, this ensures that the privacy regulations are not applied differently to different documents based on different interpretations by users.

At step 208, the non-critical section is processed by a minimally secure entity. The minimally secure entity may be an organization or individuals in an organization who are not allowed access to restricted information 104. For example, the minimally secure entity may be a data-processing organization, which performs data processing operations on document 102. The organization may be situated at a minimally secure location, which may be a foreign country that is not allowed access to restricted information 104. The minimally secure entity may be a data-processing organization, which is not located in a foreign country but is still not allowed access to restricted information. The minimally secure entity may also be a group of data-processing operators in the (source) organization, who are not allowed access to restricted information 104. The minimally secure entity may also be a resource such as a minimally secure server in which restricted information cannot be stored for security reasons.

The critical section may be recombined with the non-critical section that has been processed at the minimally secure location.

In an embodiment, the critical and non-critical sections are assigned a unique section identifier code. For example, the critical section of document 102 may be assigned a section identifier code X1, and the non-critical section a section identifier code X2. In various embodiments of the invention, the unique section-identifier code is maintained during the processing of the sections, to enable their identification after processing.

The recombining of the critical and non-critical sections is based on the unique section identifier code assigned to them. For example, the critical section of document 102 that was assigned a section identifier code X1 may be recombined with the non-critical section of document 102 that was assigned a section identifier code X2, after the non-critical section has been processed at the minimally secure location.

Mapping information relating to the assignment of the unique identifier codes to the critical and non-critical sections is stored securely at the source organization. This ensures that a minimally secure entity cannot recombine the critical and non-critical sections to obtain restricted information 104.

Figure 3:
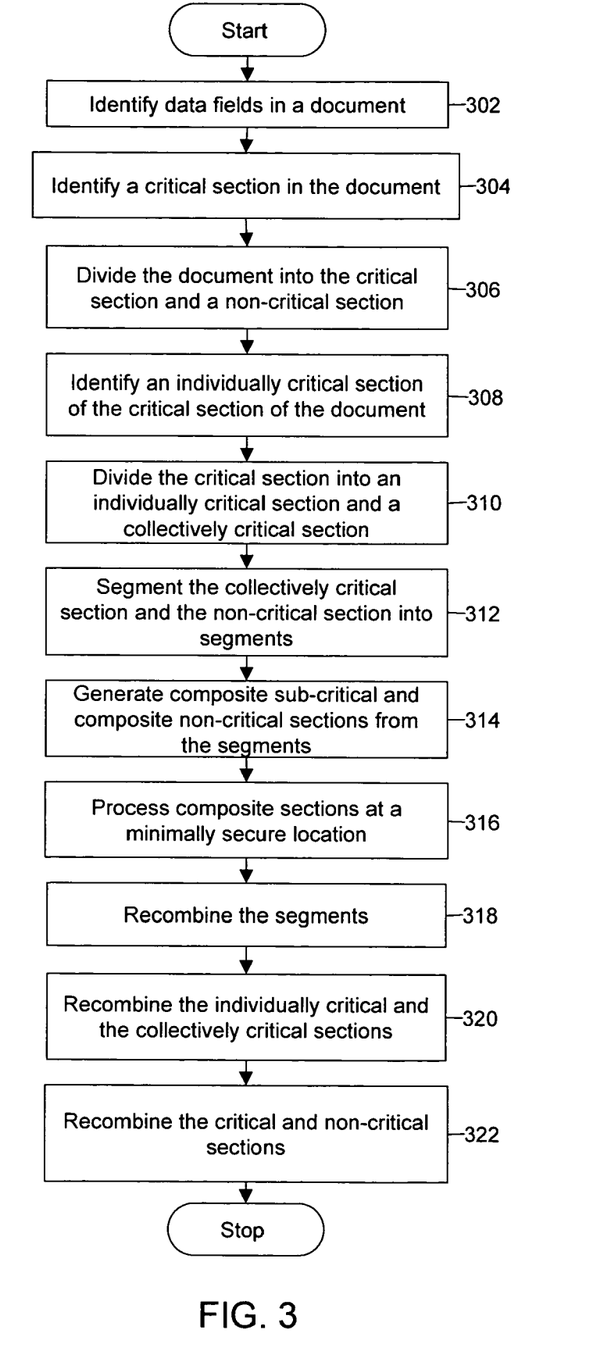
FIG. 3 is a flowchart depicting a method for processing one or more documents, in accordance with another embodiment of the present invention.

FIG. 3 is a flowchart depicting a method for processing one or more documents, in accordance with another embodiment of the present invention. At step 302, the data fields in a document 102 are identified. For example, referring to FIG. 1, data fields such as name 106, address 108, SSN 110, phone number 112, age 114, profession 116, and blood group 118 are identified in document 102 as described in step 202 of FIG. 2.

Figure 6:
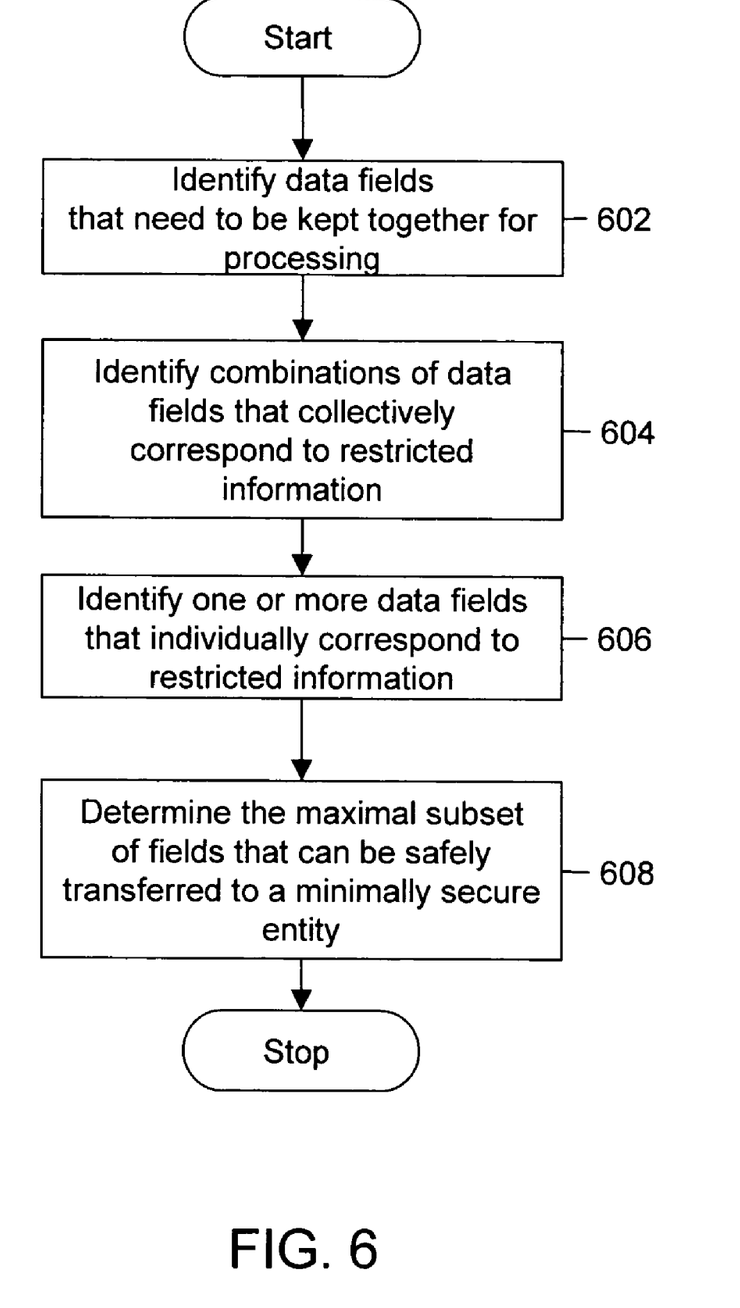
FIG. 6 is a flowchart depicting a method for maximizing the information that can be safely transferred to a minimally secure entity for processing, in accordance with various embodiments of the invention.

Thereafter, at step 304, a critical section in document 102 is identified as described in step 204 of FIG. 2 and further elaborated on in the method described in FIG. 6. According to various embodiments, the critical section includes the data fields that correspond to the restricted information 104. The critical section is created in such a manner that it includes the minimum subset of fields that correspond to restricted information.

At step 306, document 102 is divided into a critical section and a non-critical section. The non-critical section includes data fields that correspond to non-restricted information.

In an embodiment, document 102 is divided into a critical section and a non-critical section, using a computational algorithm selected from a group of graphical manipulation and text manipulation algorithms.

According to various embodiments of the present invention, the critical section and the non-critical section are assigned a unique section identifier code.

At step 308, an individually critical section within the critical section of document 102 is identified. According to various embodiments, the individually critical section includes the data fields that individually correspond to restricted information. For example, referring to FIG. 1, the individually critical section of document 102 includes data fields such as SSN 110 and phone number 112. In an embodiment of the invention, the data fields that need to be kept together for processing are treated as one segment or one entity. If one or more of these fields individually correspond to restricted information, or these fields collectively correspond to restricted information, then the fields that need to be kept together for processing are treated as one entity and included in the individually critical section. The individually critical section cannot be disclosed to a minimally secure entity.

At step 310, the critical section of document 102 is divided into an individually critical section and a collectively critical section. The collectively critical section comprises data fields that collectively correspond to restricted information. For example, the collectively critical section of document 102 includes data fields such as name 106 and address 108. The collectively critical section cannot be disclosed to a minimally secure entity unless at least one of the fields included in the collectively critical section is removed.

According to various embodiments of the present invention, a unique critical section identifier code may be assigned to the individually critical and collectively critical sections of document 102. For example, referring to FIG. 1, the individually critical section of a first document 102 is assigned a critical section identifier code K1, and the collectively critical section is assigned a critical section identifier code K2. Similarly, for a second document 102, the individually critical section is assigned a critical section identifier code P1, and the collectively critical section is assigned a critical section identifier code P2.

The unique critical section-identifier code is maintained during the processing of the sections, to enable their identification after processing.

At step 312, the collectively critical section is segmented into one or more sub-critical segments. Each sub-critical segment includes at least one instance of a data field from a set of fields that collectively correspond to the restricted information and never includes all of the fields of a set of fields that collectively correspond to restricted information. For example, referring to FIG. 1, in the collectively critical section of document 102, name 106 and address 108 collectively correspond to restricted information. The collectively critical section of document 102 may be segmented into a sub-critical segment that includes name 106, another sub-critical segment that includes address 108, and so forth. In an embodiment of the invention, the segmenting can be carried out by copying the section of the document that corresponds to name 106 into a new file and masking the area corresponding to name 106 with a black rectangle. The collectively critical sections of other such documents 102 may be segmented in the same way.

In an embodiment of the invention, the data fields that need to be kept together for processing are treated as one segment or one entity and are included in the same sub-critical segment.

In an embodiment, the non-critical section may also be segmented in the same way as the collectively critical section.

According to various embodiments of the present invention, a unique segment identifier code may be assigned to each sub-critical and non-critical segment. For example, referring to FIG. 1, for document 102, the sub-critical segment that includes name 106 is assigned a segment identifier code A1, and the sub-critical segment that includes address 108 is assigned a segment identifier code A2. Similarly, for another document 102, the sub-critical segment that includes name 106 is assigned a segment identifier code B1, and the sub-critical segment that includes address 108 is assigned a segment identifier code B2.

At step 314, composite sub-critical sections that include sub-critical segments from different documents, are generated. The composite sub-critical sections are generated in such a way that no more than one sub critical segment from the same collectively critical subset of fields is included in the same composite sub-critical section. For example, the sub-critical segment that includes name 106 is included in a first composite sub-critical section. Similarly, the sub-critical segment that includes address 108 is included in a second composite sub-critical section. Thereby, it is ensured that name 106 and address 108, which collectively correspond to restricted information 104 from a given document 102, are not included in the same composite sub-critical section.

In an embodiment of the invention, certain data fields may need to be kept together for processing. The data fields that need to be kept together for processing are treated as one segment or one entity and are included in the same section and the same composite section.

In another embodiment, composite non-critical sections comprising non-critical segments from different documents are generated in the same way that the composite sub-critical sections are generated.

At step 316, a minimally secure entity at a minimally secure location processes the composite sub-critical sections. In an embodiment, the composite non-critical sections are also processed by a minimally secure entity. The unique segment-identifier code is maintained during the processing of the composite sections, to enable identification of segments within composite sections after processing.

In various embodiments of the invention, composite sub-critical sections, or even composite non-critical sections, may be further divided into subsets before they are processed at step 312. The method for dividing the composite sub-critical section is elaborated on in conjunction with FIG. 4. The division of composite sections (composite sub-critical sections and the composite non-critical sections) into further subsets ensures additional protection for restricted information 104.

At step 318, the sub-critical segments in the composite sub-critical sections are recombined after they have been processed at the minimally secure location. The process of recombining the sub-critical segments is based on the unique segment identifier code assigned to each sub-critical segment. For example, the sub-critical segment that had been assigned the segment identifier code A1 is recombined with the sub-critical segment that had been assigned the segment identifier code A2, to regenerate the collectively critical section of a first document 102. Similarly, the sub-critical segment that had been assigned the segment identifier code B1 is recombined with the sub-critical segment that had been assigned the segment identifier code B2, to regenerate the collectively critical section of a second document 102, and so forth. Information relating to the assignment of the unique identifier codes to sub-critical and non-critical segments is stored securely at the source organization. This ensures that a minimally secure entity cannot recombine the sub-critical segments to obtain restricted information 104.

In an alternate embodiment, the non-critical segments may also be recombined after they are processed at a minimally secure location, to regenerate non-critical sections in the same way as sub-critical segments are recombined to generate collectively critical sections.

At step 320, the individually critical section and the corresponding collectively critical section are recombined after the collectively critical section has been processed at the minimally secure location. The process of recombining the individually critical and the collectively critical sections is based on the unique critical section identifier code assigned to each section. For example, the collectively critical section that had been assigned the section identifier code K1 is recombined with the individually critical section that had been assigned the section identifier code K2 to regenerate the critical section of document 102.

Information pertaining to the assignment of the unique identifier codes to collectively critical and individually critical sections is stored securely at the source organization. This ensures that a minimally secure entity cannot recombine the collectively critical and the individually critical sections to obtain restricted information.

At step 322, the critical section of document 102 is recombined with the non-critical section to generate the document 102. The process of recombining the critical and non-critical sections is based on the unique section identifier codes assigned to the sections.

Information pertaining to the assignment of the unique identifier codes to critical and non-critical sections is stored securely at the source organization.

Figure 4:
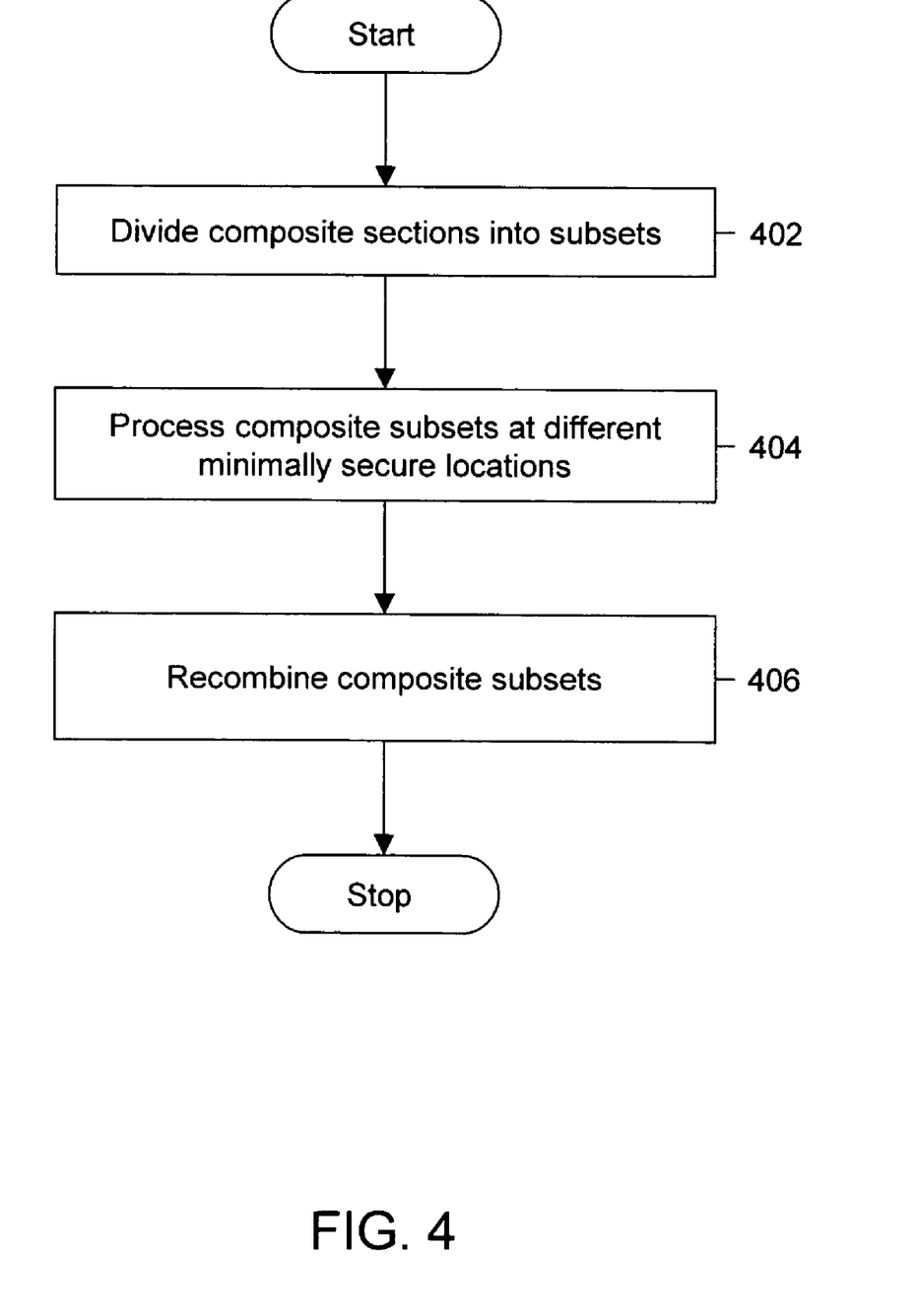
FIG. 4 is a flowchart depicting a method for dividing the composite sections of one or more documents, in accordance with an embodiment of the present invention.

FIG. 4 is a flowchart depicting a method for dividing the composite sections of documents into one or more subsets, in accordance with an embodiment of the present invention. This may be applicable in a situation where a company does not wish a minimally secure entity to have access to even non-restricted information in its totality.

At step 402, the composite sections of documents are further divided into one or more subsets. For example, in a situation where a company requires outsourcing of its bookkeeping operations, documents containing information relating to the identity of the company's customers and the company's financial transactions may be transferred to a minimally secure entity for processing. The documents may be divided into a critical section and a non-critical section. The critical section may be further divided into an individually critical section and a collectively critical section. The individually critical section of the documents, comprising fields that relate to restricted information (such as the identity of the company's customers) may not be transferred to the minimally secure entity for processing. The non-critical sections of the documents, comprising fields that relate to non-critical information (such as revenues and expenses relating to financial transactions) may be further segmented into non-critical segments, such that each non-critical segment contains information (revenues and expenses) relating to a single transaction. Composite non-critical sections comprising non-critical segments from different documents may be generated. These composite non-critical sections may be transferred to the minimally secure entity for processing. However, the company may not wish to provide the minimally secure entity access to information that can be used by the minimally secure entity to calculate the financial standing (such as the net profit) of the company. Information contained in the composite non-critical sections may be used by the minimally secure entity to calculate the net profit of the company.

Therefore, the composite non-critical sections of documents are further divided into subsets and sent to different minimally secure entities for processing. This ensures that a single minimally secure entity does not have access to all composite non-critical sections, to calculate the net profit of the company. The composite non-critical sections may be divided into composite non-critical subsets in various ways. For example, a composite non-critical section that contains the details of the revenues and expenses of random transactions may be divided into two subsets. The first subset may contain the fields that relate to the revenues and expenses of odd numbered transactions, while the second subset may contain the fields that relate to the revenues and expenses of even numbered transactions. Both of the composite non-critical subsets may be transferred to different minimally secure entities for processing. Therefore, a single minimally secure entity does not have access to the information that can be used to calculate the net profit of the company. However, this still allows a single minimally secure entity access to all the information that can be used to approximate the average profitability of the company.

In an alternate embodiment, each composite non-critical subset that contains the details of the revenues and expenses for random transactions may be further divided. The first subdivision of a composite non-critical subset may contain the fields that relate to the revenues of random transactions, while the second subdivision of a composite non-critical subset may contain the fields that relate to the expenses of the random transactions. Both the subdivisions may be transferred to different minimally secure entities for processing. This ensures that a single minimally secure entity does not have access to information that can be used to calculate the net profit, or even the average profitability, of the company. In an embodiment, the composite collectively critical subsets may be divided into subsets in the same way that non-critical subsets are divided.

According to various embodiments of the present invention, the composite subsets may be assigned unique subset identifier codes. For example, a composite non-critical section K may be divided into two subsets. The first composite non-critical subset may be assigned the subset identifier code K1 and the second composite non-critical subset may be assigned the subset identifier code K2. Thereafter, at step 404, the composite non-critical subsets are processed at different minimally secure locations. For example, the composite non-critical subset, which was assigned a subset identifier code K1, may be processed at a first minimally secure location, and the second composite non-critical subset, which was assigned a subset identifier code K2, may be processed at a second minimally secure location.

In an embodiment, the composite sub-critical subsets may be processed at different minimally secure locations in the same way that non-critical subsets are processed.

The subset-identifier code is maintained during the processing of the subsets, to enable identification of subsets after processing.

At step 406, the composite non-critical subsets may be recombined after they are processed at different minimally secure locations. The recombining procedure may be based on the unique subset identifier codes assigned to each subset. For example, the first composite non-critical subset, which was assigned a subset identifier code K1, may be recombined with the second composite non-critical subset, which was assigned a subset identifier code K2, to regenerate the composite non-critical section K.

In an embodiment, the composite sub-critical subsets may also be recombined after they are processed at different minimally secure locations, to regenerate the composite sub-critical section.

Information relating to the assignment of the unique identifier codes to the composite sub-critical and non-critical subsets is stored confidentially at the source organization. This ensures that a minimally secure entity cannot recreate the original data by recombining the composite sub-critical subsets and the non-critical subsets even if it collaborates with another minimally secure entity. Further, the source organization may not transfer one or more composite subsets to any of the minimally secure entities. Such one or more composite subsets may be processed in-house by the source organization. This eliminates the possibility of recreating certain restricted information (such as the total revenues and total expenses of the company in the example above) even if all of the minimally secure entities collaborate among themselves.

The various embodiments of the present invention can be implemented by a system that comprises various modules to carry out the method steps of the present invention.

Figure 5A:
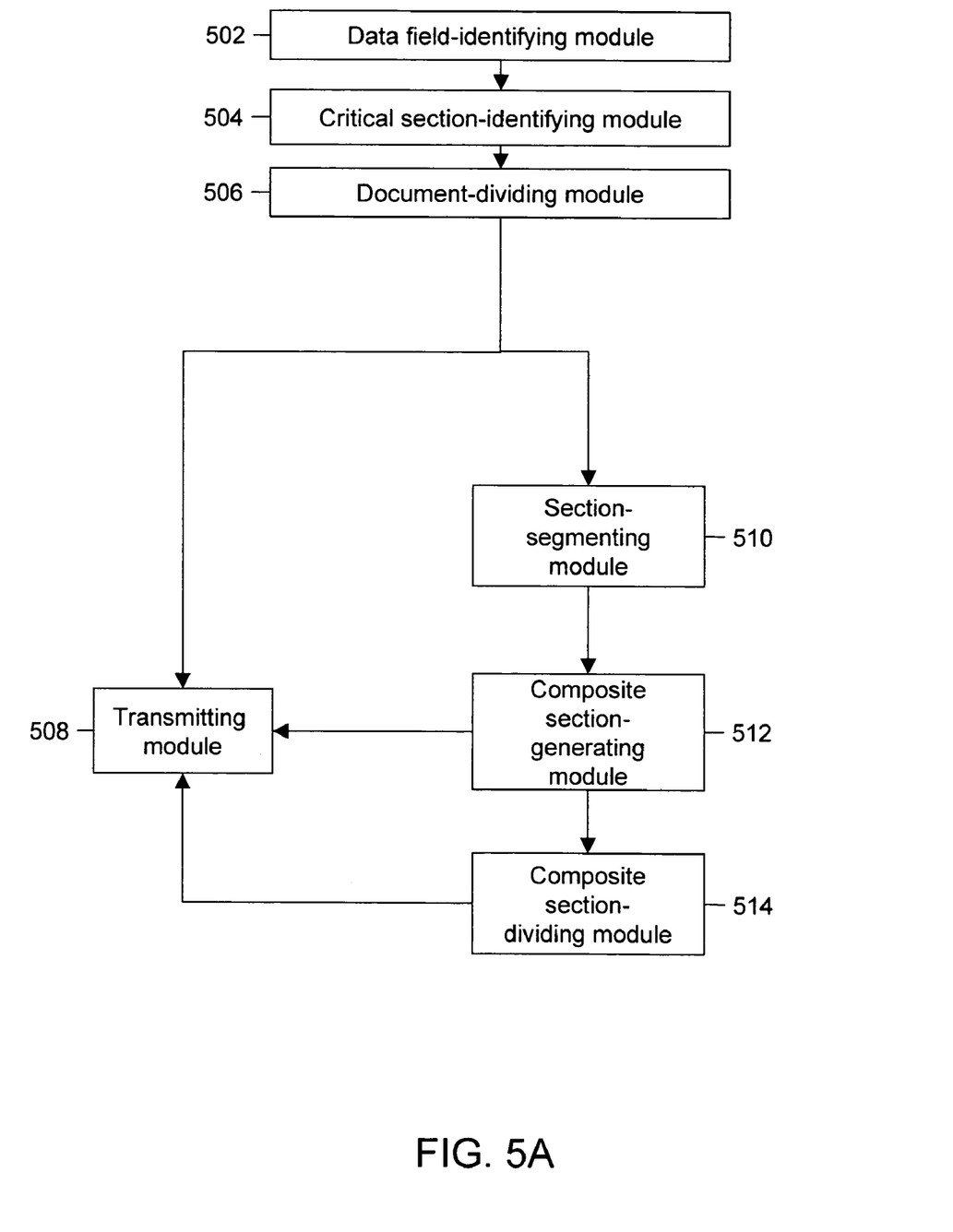
FIGS. 5A, 5B, 5C and 5D represent block diagrams illustrating a system for processing one or more documents, in accordance with an embodiment of the present invention.

FIG. 5A represents a block diagram illustrating a system for processing one or more documents, in accordance with an embodiment of the present invention.

According to various embodiments of the invention, the system includes a data field-identifying module 502, which identifies the various data fields in a document. For example, referring to FIG. 1, data field-identifying module 502 identifies name 106, address 108, Social Security Number (SSN) 110, phone number 112, age 114, profession 116, and blood group 118 in document 102 using the method described in step 202 of FIG. 2.

Based on the data fields identified by data field-identifying module 502, a critical section-identifying module 504 identifies a critical section and a non-critical section in the document using the method described in step 204 of FIG. 2 and further elaborated on in the method described in FIG. 6. The non-critical section includes the maximum subset of data fields that correspond to non-restricted information. The critical section includes the minimum subset of data fields that correspond to restricted information 104 in the document 102. For example, critical section-identifying module 504 identifies a critical section for document 102, which includes one or more data fields such as name 106 and address 108, SSN 110 and phone number 112. The section-identifying module 504 also identifies a non-critical section for document 102, which includes phone number 112, age 114, profession 116, and blood group 118 in document 102. In an embodiment of the invention, the critical sections are identified such that the maximum number of data fields can be processed with a minimal security risk involved during the processing of document 102. An exemplary method for maximizing the information that can be safely transferred to a minimally secure entity for processing, in accordance with various embodiments of the invention is described in conjunction with FIG. 6. The critical section-identifying module further identifies an individually critical section of each critical section comprising data fields that individually correspond to restricted information.

Thereafter, a document-dividing module 506 divides the document into a critical section and a non-critical section. The document-dividing module 506 further divides the critical section into an individually critical section and a collectively critical section. Further, a transmitting module 508 transmits the non-critical section to a minimally secure location for processing.

According to various embodiments of the present invention, a section-segmenting module 510 segments the collectively critical section into one or more sub-critical segments. Each sub-critical segment contains at least one instance of a data field corresponding to restricted information and never includes all of the fields of a set of fields that collectively correspond to restricted information. Section-segmenting module 510 also segments the non-critical section into one or more non-critical segments. Each non-critical segment contains at least one instance of a data field corresponding to non-restricted information.

Thereafter, a composite section-generating module 512 generates composite sub-critical sections by randomly recombining sub-critical segments from different documents. The composite sub-critical sections are generated in such a way that no more than one sub critical segment from the same collectively critical subset of fields is included in the same composite sub-critical section. Composite section-generating module 512 can further generate composite non-critical sections by randomly recombining non-critical segments from different documents. Each composite non-critical section comprises one or more instances of a non-critical segment from a given document.

Composite section-generating module 512 is connected to transmitting module 508, which transmits the composite sub-critical section and the composite non-critical section to the minimally secure location for processing.

According to various embodiments of the present invention, composite section-generating module 512 is further connected to a composite section-dividing module 514, which divides the composite sub-critical section into at least two subsets. Composite section-dividing module 514 can also divide the composite non-critical section into at least two subsets.

Thereafter, transmitting module 508 transmits the composite sub-critical subsets and composite non-critical subsets to different minimally secure locations for processing.

Figure 5B:
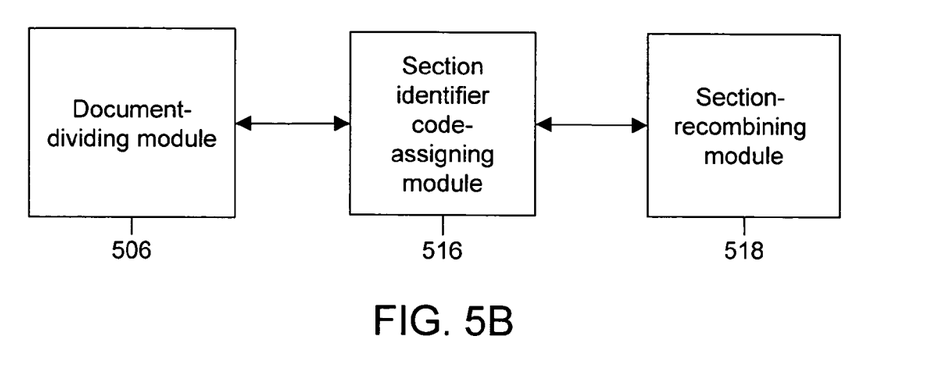

FIG. 5B represents a block diagram illustrating a system for processing one or more documents, in accordance with an embodiment of the present invention.

According to various embodiments of the present invention, document-dividing module 506 is connected to a section identifier code-assigning module 516, which assigns a unique section identifier code to the critical section and a unique section identifier code to the non-critical sections of document 102. Section identifier code assigning module 516 further assigns a unique critical section identifier code to the individually critical and a unique section identifier code to the collectively critical section.

The unique section identifier code assigned by the section identifier code-assigning module is maintained during the processing of the sections. Section identifier code-assigning module 516 is further connected to a section-recombining module 518. Section identifier code-assigning module 516 provides information pertaining to the unique section identifier codes to section-recombining module 518. Section-recombining module 518 recombines the individually critical sections and the collectively critical sections to regenerate the critical section of document 102. The section-recombining module 518 further recombines the critical section and the non-critical section after they are processed by the minimally secure entity, to regenerate document 102.

Figure 5C:
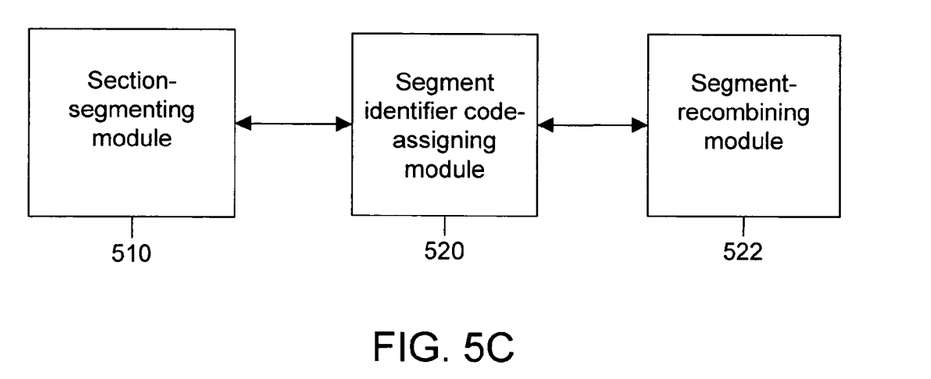

FIG. 5C represents a block diagram illustrating a system for processing one or more documents, in accordance with an embodiment of the present invention.

According to various embodiments of the present invention, section-segmenting module 510 is connected to a segment identifier code-assigning module 520, which assigns a unique segment identifier code to each sub-critical and each non-critical segment of document 102. The unique segment identifier code assigned by the segment identifier code-assigning module is maintained during the processing of the segments. Segment identifier code-assigning module 520 is further connected to a segment-recombining module 522. Segment identifier code-assigning module 520 provides information pertaining to the segment-identifier codes to the segment-recombining module 522. Segment-recombining module 522 recombines the sub-critical and non-critical segments after they are processed by the minimally secure entity, to regenerate the collectively critical and non-critical sections respectively.

Figure 5D:
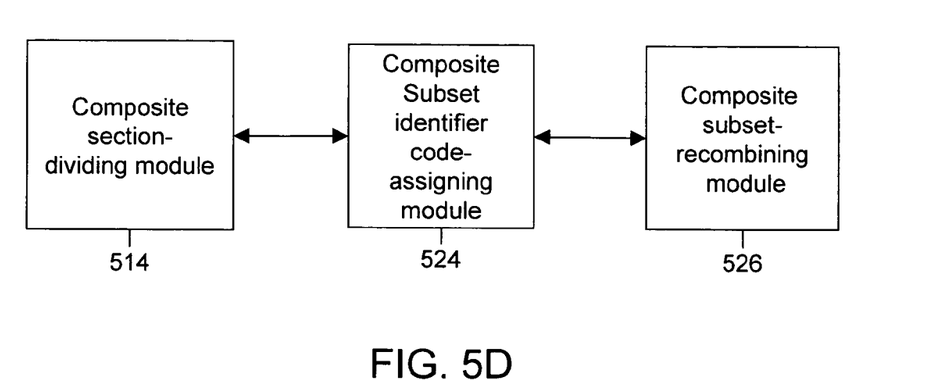

FIG. 5D represents a block diagram illustrating a system for processing one or more documents, in accordance with an embodiment of the present invention.

According to various embodiments of the present invention, composite section-dividing module 514 is connected to a composite subset identifier code-assigning module 524, which assigns a unique composite subset identifier code to each subset of the sub-critical and non-critical composite sections. The unique composite subset identifier codes assigned by the composite subset identifier code-assigning module are maintained during the processing of the subsets of the sub-critical and non-critical composite sections. Composite subset identifier code-assigning module 524 is further connected to a composite subset-recombining module 526. Composite subset identifier code-assigning module 524 provides information pertaining to unique composite subset identifier codes to a composite subset-recombining module 526. Composite subset-recombining module 526 recombines the composite sub-critical and non-critical subsets after they have been processed by different minimally secure entities, to regenerate the composite critical and non-critical sections.

FIG. 6 is a flowchart depicting a method for maximizing the information that can be safely transferred to a minimally secure entity for processing, in accordance with various embodiments of the invention. The method for maximizing the information that can be safely transferred to a minimally secure entity for processing may be based on certain rules that may be defined by a user and/or built-in rules based on appropriate regulations, and industry best practices. The built-in rules describe constraints based on normative tags, while the user defined rules may describe constraints based on user specific tags or normative tags. As described in step 202, the rules based on either normative tags or user specific tags may be treated as equivalent. The built-in rules may be specific to the industry, country, etc. The algorithm used for implementing the method may automatically apply only the built-in rules that are appropriate to the user based on industry and location data specified by the user.

In various embodiments of the invention, the following two major types of rules may be applied in the method for maximizing the information that can be safely transferred to a minimally secure entity for processing:

(i) Atomicity rules: These relate to data fields that need to be kept together for processing. The atomicity rules may be specified by a user based on unique business needs. For example, a user may specify that the fields such as 'name' and 'gender' may need to be kept together for processing. In another example, certain built-in rules may be based on industry best practices. For example, a default built-in rule may specify that the fields such as "category_id" and "product_id" should always be kept together for processing. In various embodiments of the invention, a manual or an automated evaluation of the appropriate process description or workflow may lead to the identification of such atomicity rules. For example, if a process calculates the sum of two numbers, then the corresponding fields relating to the two numbers may be kept together for processing.

(ii) Information security rules: These relate to data fields that correspond to restricted information: The information security rules may be specified by a user based on unique business needs. For example, a user may specify that fields such as 'taxable income' correspond to restricted information. In another example, certain default built-in rules may also be provided based on relevant regulations or industry best practices. For example, a built-in rule may specify that the field "social security number" may correspond to restricted information. In various embodiments of the invention, such rules may be defined by an automated evaluation of the values of a given field. For example, if a field called "foo" only contains the values "HIV positive" and "HIV negative", then the field may be automatically identified as corresponding to restricted information, even though the tag name "foo" cannot be mapped to a pre-specified normative tag. In various embodiments of the invention, the information security rules may specify that a tag may be confidential by itself, or that a combination of tags may be confidential when they appear together.

At step 602, data fields that need to be kept together for processing are identified based on the above rules. For example, if the rent per square feet needs to be computed, then the fields that relate to the total rent and total area (in square feet) need to be kept together. Such combinations of data fields are treated as a single entity. At step 604, combinations of fields that collectively correspond to restricted information are identified based on the above rules. At step 606, one or more data fields that individually correspond to restricted information are identified based on the above rules. Subsequently, at step 608, a maximal subset of fields that can be safely transferred to a minimally secure entity is determined so that (i) fields, according to step 606, do not occur, (ii) fields, according to step 602, are kept together, and (iii) at least one field in field sets, according to step 604, is not present. This is the maximal subset set of fields that can be outsourced for processing. In an embodiment of the invention, a weight can be assigned to each data field (e.g., based on the amount of labor needed to process each field. In this case, the maximal subset of fields represents the fields that are the most labor-intensive to process.) In various embodiments of the invention, a weight can be assigned on the basis of the time involved in processing each field, the cost involved in processing each field, the outsourcing risk involved in processing each field, and so forth. The calculation of the maximal set as described above is a standard constraint optimization problem, which can be solved by any appropriate optimization algorithm.

Figure 7:
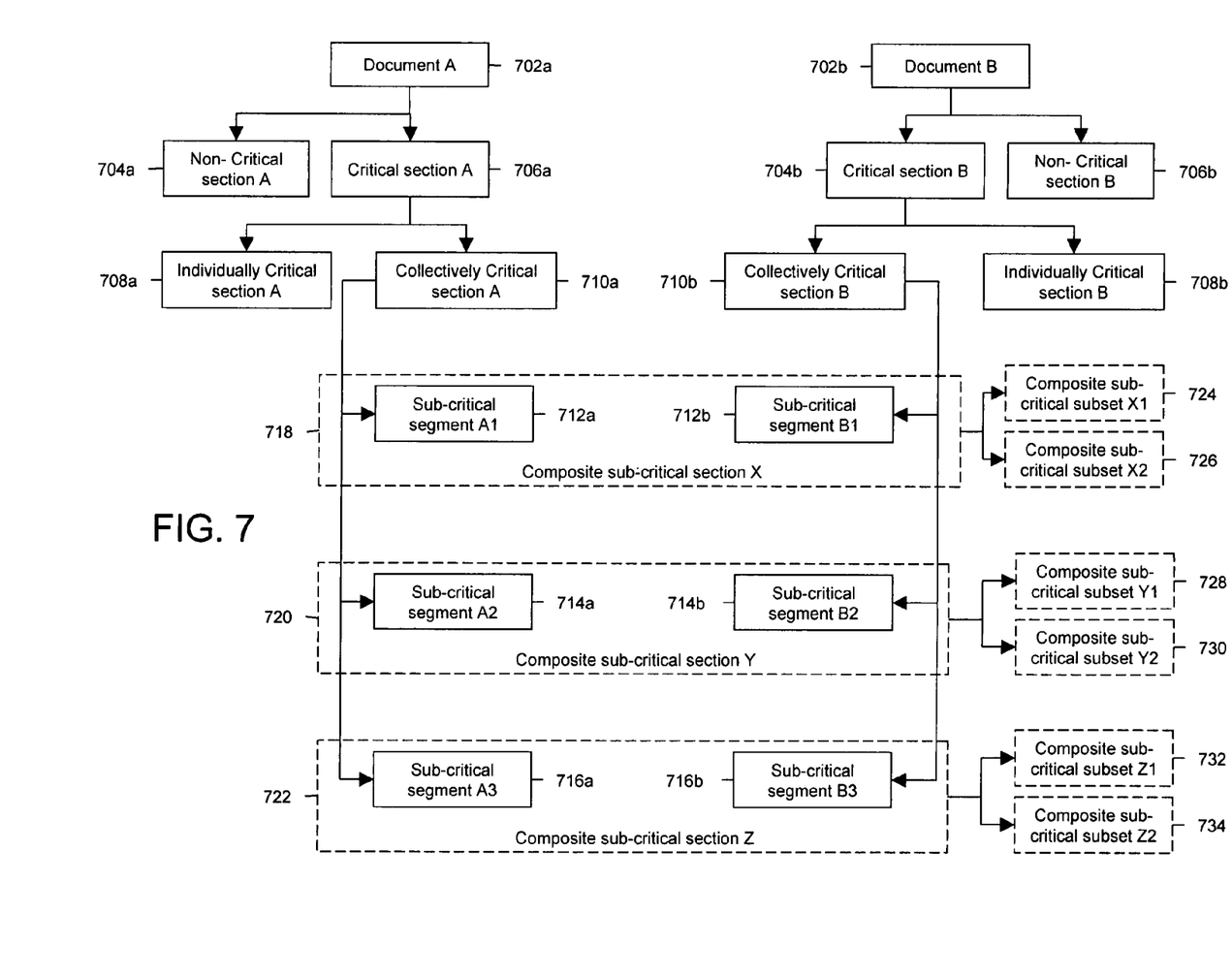
FIG. 7 is a block diagram illustrating the division of one or more documents, in accordance with an embodiment of the present invention.

FIG. 7 is a block diagram illustrating the division of one or more documents, in accordance with an embodiment of the present invention. According to various embodiments of the present invention, a document A 702*a* may be divided into a non-critical section 704*a* and a critical section 706*a*. The critical section 704*a* may be further divided into an individually critical section 708*a* and a collectively critical section 710*a*. The collectively critical section 710*a* may be segmented into a sub-critical segment A1 712*a*, a sub-critical segment A2 714*a* and a sub-critical segment A3 716*a*.

Similarly, a document B 702*b* may be divided into a non-critical section 704*b* and a critical section 706*b*. The critical section 704*b* may be further divided into an individually critical section 708*b* and a collectively critical section 710*b*. The collectively critical section 710*b* may be segmented into a sub-critical segment A1 712*b*, a sub-critical segment A2 714*b* and a sub-critical segment A3 716*b*.

The sub-critical segments from document A 702*a* and document B 702*b* may be recombined to give composite sub-critical subsets. For example, sub-critical segment A1 712*a* may be recombined with sub-critical segment B1 712*b* to form a composite sub-critical section X 718. Similarly, sub-critical segment A2 714*a* may be recombined with sub-critical segment B2 714*b* to form a composite sub-critical section Y 720 and sub-critical segment A3 716*a* may be recombined with sub-critical segment B3 716*b* to form a composite sub-critical section Z 722. The composite sub-critical sections may be divided into one or more subsets. For example, composite sub-critical section X 718 is divided into a composite sub-critical subset X1 724 and a composite sub-critical subset X2 726. Similarly other composite sub-critical sections may be divided into further subsets.

According to various embodiments of the invention, the non-critical sections of documents may also be segmented into non-critical segments in the same manner as the collectively critical sections are segmented into sub-critical segments. The non-critical segments of different documents may be recombined to produce composite non-critical sections.

The embodiments of the present invention have the advantage that they provide a method for processing documents containing restricted information.

Various embodiments of the present invention also provide a method for protecting restricted information in a document, while processing the document at a minimally secure location.

Various embodiments of the present invention allow the maximization of the subset of a document that can be processed at a less-secure location or by using a less secure resource. The maximization technique (described in conjunction with FIG. 6) optionally takes into consideration the relative weights for each field. For example, the maximal subset of fields can represent the subset of the document that is the most labor-intensive to process, thereby enabling maximal processing at a low-cost, low-security location, without risking the confidentiality of restricted information.

Various embodiments of the present invention allow software systems to incorporate and automatically enforce the information-sharing restrictions specified by competent authorities, thereby simplifying compliance with such regulations.

The embodiments of the present invention further enable the protection of restricted information, even if encryption and access restriction systems fail and a malicious third party gains access to the documents.

The system, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps constituting the method of the present invention.

The computer system comprises a computer, an input device, a display unit, and the Internet. The computer comprises a microprocessor. The microprocessor can be one or more general- or special-purpose processors such as a Pentium®, Centrino®, Power PC®, and a digital signal processor. The microprocessor is connected to a communication bus. The computer also includes a memory, which may include Random Access Memory (RAM) and Read Only Memory (ROM). The computer system also comprises a storage device, which can be a hard disk drive or a removable storage device such as a floppy disk drive, an optical disk drive, and so forth. The storage device can also be other similar means for loading computer programs or other instructions into the computer system. The computer system also includes one or more user input devices such as a mouse and a keyboard, and one or more output devices such as a display unit and speakers.

The computer system includes an operating system (OS) such as Windows, Windows CE, Mac, Linux, Unix, a cellular phone OS, or a proprietary OS.

The computer system executes a set of instructions that are stored in one or more storage elements, to process input data. The storage elements may also hold data or other information, as required. A storage element may be an information source or physical memory element present in the processing machine.

The set of instructions may include various commands that instruct the processing machine to perform specific tasks, such as the steps constituting the method of the present invention. The set of instructions may be in the form of a software program. The software may be in various forms, such as system software or application software. Further, the software may be in the form of a collection of separate programs, a program module with a larger program, or a portion of a program module. The software might also include modular programming in the form of object-oriented programming, and may use any suitable language such as C, C++ and Java. The processing of input data by the processing machine may be in response to user commands to results of previous processing or to a request made by another processing machine.

While the preferred embodiments of the invention have been illustrated and described, it will be clear that it is not limited to these embodiments only. Numerous modifications, changes, variations, substitutions and equivalents will be apparent to those skilled in the art, without departing from the spirit and scope of the invention, as described in the claims.

What is claimed is:

1. A computer-implemented method for processing one or more documents, the documents containing restricted information, the restricted information not to be disclosed at a minimally secure location, the method comprising software executing on a computer system to execute the steps of:
   identifying one or more data fields in each document;
   identifying collectively critical sections of the documents, each collectively critical section comprising two or more data fields that are defined by information security rules as collectively corresponding to restricted information;
   identifying non-critical sections of the documents, wherein the non-critical sections are not restricted information according to the information security rules, the non-critical sections to be processed at the minimally secure location;
   segmenting each collectively critical section into two or more sub-critical segments, wherein each sub-critical segment is missing at least one data field from the collectively critical section, whereby each sub-critical segment by itself is not restricted information according to the information security rules, the sub-critical segments to be processed at the minimally secure location;
   recombining the sub-critical segments of each collectively critical section after processing at the minimally secure location; and
   recombining the collectively critical section and the non-critical section of each document after processing at the minimally secure location.

2. The method of claim 1 further comprising the steps of:
   assigning a unique section identifier code to the critical section and a unique section identifier code to the non-critical section of each document; and
   recombining the critical section and the non-critical section after processing at the minimally secure location based on the unique section identifier code assigned to each critical section and each non-critical section of each document.

3. The method of claim 2, wherein the unique section identifier code is maintained during the processing of the non-critical section.

4. The method of claim 1 further comprising the steps of:
   assigning a unique segment identifier code to each sub-critical segment of each document; and
   recombining the sub-critical segments of each collectively critical section after processing at the minimally secure location based on the unique segment identifier code assigned to each sub-critical segment.

5. The method of claim 1 further comprising the step of:
   generating a composite sub-critical section, the composite sub-critical section comprising sub-critical segments from different collectively critical sections, wherein each composite sub-critical segment by itself is not restricted information according to the information security rules,
   the composite sub-critical section to be processed at the minimally secure location.

6. The method of claim 1 further comprising the steps of:
   identifying individually critical sections of the documents, each individually critical section comprising a data field that individually corresponds to restricted information according to the information security rules; and
   recombining the individually critical section and the collectively critical section of each document, after processing of the sub-critical segments at the minimally secure location.

7. The method of claim 5 further comprising the steps of:
   dividing the composite sub-critical section into at least two composite sub-critical subsets, the composite sub-critical subsets to be processed at different minimally secure locations;
   assigning a unique composite subset identifier code to each composite sub-critical subset; and
   recombining the composite sub-critical subsets after processing at the different minimally secure locations based on the unique composite subset identifier code assigned to each composite sub-critical subset.

8. The method of claim 7 wherein one or more composite sub-critical subsets are not transferred to one or more minimally secure locations.

9. The method of claim 1 further comprising the steps of:
   segmenting the non-critical section into one or more non-critical segments;
   generating a composite non-critical section, the composite non-critical section comprising one or more non-critical segments from multiple documents, the composite non-critical section to be processed at the minimally secure location; and
   recombining the non-critical segments after processing at the minimally secure location.

10. The method of claim 1, further comprising the steps of:
    identifying data fields that need to be kept together for processing, wherein the identified data fields are kept together during processing at the minimally secure location.

11. The method of claim 10, wherein the identified data fields are from a collectively critical section.

12. The method of claim 10, wherein the identified data fields are from a non-critical section.

13. A system implemented on a computer having a processor, the system for processing one or more documents, the documents containing restricted information, the restricted information not to be disclosed at a minimally secure location, the system comprising:

a processor;
a data field-identifying module, for identifying one or more data fields in each document;
a critical section-identifying module, for identifying collectively critical sections of the documents, each collectively critical section comprising two or more data fields that are defined by information security rules as collectively corresponding to restricted information;
a non-critical section-identifying module, for identifying non-critical sections of the documents, wherein the non-critical sections are not restricted information according to the information security rules, the non-critical sections to be processed at the minimally secure location;
a document-dividing module, for segmenting each collectively critical section into two or more sub-critical segments, wherein each sub-critical segment is missing at least one data field from the collectively critical section, whereby each sub-critical segment by itself is not restricted information according to the information security rules, the sub-critical segments to be processed at the minimally secure location; and
a recombining module, for recombining the sub-critical segments of each collectively critical section after processing at the minimally secure location, and further for recombining the collectively critical section and the non-critical section of each document after processing at the minimally secure location.

14. The system of claim 13, wherein the critical section-identifying module identifies the collectively critical sections on the basis of pre-defined information sharing restrictions.

15. The system of claim 13, wherein the critical section-identifying module further identifies individually critical sections of the documents, each individually critical section comprising a data field that individually corresponds to restricted information according to the information security rules; and the recombining module further recombines the individually critical section and the collectively critical section of each document, after processing of the sub-critical segments at the minimally secure location.

16. The system of claim 13, wherein the document-dividing module comprises a computational dividing algorithm that is compatible with the format of the document.

17. The system of claim 13, wherein the document-dividing module comprises a computational masking algorithm that is compatible with the format of the document.

18. The system of claim 16, wherein the computational dividing algorithm is selected from the group of graphical manipulation algorithms, text manipulation algorithms, audio manipulation algorithms and any other computational algorithm that is compatible with the format of the document.

19. The system of claim 17, wherein the computational masking algorithm is selected from the group of graphical manipulation algorithms, text manipulation algorithms, audio manipulation algorithms and any other computational algorithm that is compatible with the format of the document.

20. The system of claim 13 further comprising:
a section identifier code-assigning module for assigning a unique section identifier code to the critical section and a unique section identifier code to a non-critical section of each document, wherein the document-dividing module divides the document into one or more non-critical sections and the critical section; and
a section-recombining module for recombining the critical section and the non-critical section(s) based on the unique section identifier code assigned to each critical section and each non-critical section.

21. The system of claim 13 further comprising:
a segment identifier code-assigning module, for assigning a unique segment identifier code to each sub-critical segment;
a composite section-generating module, for generating a composite sub-critical section, the composite sub-critical section comprising sub-critical segments from different collectively critical sections, wherein each composite sub-critical segment by itself is not restricted information according to the information security rules, composite sub-critical section to be processed at the minimally secure location; and
wherein the recombining module recombines the sub-critical segments after processing at the minimally secure location based on the unique segment identifier code assigned to each sub-critical segment.

22. The system of claim 21 further comprising:
a composite section-dividing module for dividing the composite sub-critical section into at least two composite sub-critical subsets;
a composite subset identifier code-assigning module for assigning a unique subset identifier code to each composite sub-critical subset; and
a composite subset-recombining module for recombining composite sub-critical subsets after processing at different minimally secure locations based on the unique subset identifier code assigned to each composite sub-critical subset.

23. The system of claim 13, further comprising:
a transmitting module, for transmitting the sub-critical segments to the minimally secure location for processing.

24. The system of claim 23, wherein the transmitting module further transmits the composite sub-critical subsets and the composite non-critical subsets to different minimally secure locations for processing.

25. The system of claim 13, wherein the document-dividing module further segments non-critical sections into one or more non-critical segments.

26. The system of claim 21, wherein the composite section-generating module further generates a composite non-critical section, the composite non-critical section comprising one or more non-critical segments from multiple documents.

27. A computer program product for use with a computer, the computer program product comprising a non-transitory computer usable medium having a computer program code embodied therein for processing one or more documents, the documents containing restricted information, the restricted information not to be disclosed at a minimally secure location, the computer program code performing the steps of:
identifying one or more data fields in each document;
identifying collectively critical sections of the documents, each collectively critical section comprising two or more data fields that are defined by information security rules as collectively corresponding to restricted information;
identifying non-critical sections of the documents, wherein the non-critical sections are not restricted information according to the information security rules, the non-critical sections to be processed at the minimally secure location;
segmenting each collectively critical section into two or more sub-critical segments, wherein each sub-critical segment is missing at least one data field from the collectively critical section, whereby each sub-critical segment by itself is not restricted information according to the information security rules, the sub-critical segments to be processed at the minimally secure location;

recombining the sub-critical segments of each collectively critical section after processing at the minimally secure location; and recombining the collectively critical section and the non-critical section of each document after processing at the minimally secure location.

28. The method of claim 1 wherein at least one of the sub-critical segments is not processed at the minimally secure location.

29. The method of claim 28 wherein the step of segmenting each collectively critical section into sub-critical segments comprises the steps of:

determining a maximal subset of data fields for the collectively critical section; and including the maximal subset of data fields in the sub-critical segment(s) to be processed at the minimally secure location.

30. The method of claim 29 wherein the step of determining a maximal subset of data fields for the collectively critical section comprises the steps of:

assigning relative weights to different data fields; and maximizing the total relative weights of data fields in the maximal subset of data fields.

31. The method of claim 30 wherein the relative weights for the data fields are based on labor required to process the data field.

32. The method of claim 1 wherein the sub-critical segments are processed at the minimally secure location in a form that would not be permitted if the sub-critical segments were restricted information.

33. The method of claim 32 wherein the sub-critical segments are processed at the minimally secure location in unencrypted form.

34. The method of claim 32 wherein the sub-critical segments are processed at the minimally secure location in plain-text form.

35. The method of claim 1 wherein restricted information includes personally identifiable information.

36. The method of claim 1 wherein the collectively critical sections would be prohibited by law from transfer to the minimally secure location, but the sub-critical segments are not so prohibited.

37. The method of claim 1 wherein the collectively critical section consists of a minimal subset of data fields that collectively correspond to restricted information, and each sub-critical segment contains less than all of the data fields from the collectively critical section.

38. The method of claim 1 wherein information security rules include rules based on compliance with regulations.

39. The method of claim 1 wherein information security rules include rules based on industry best practices.

40. The method of claim 1 wherein information security rules include rules based on contract requirements.

41. The method of claim 1 wherein information security rules include rules based on privacy regulations.

42. The method of claim 1 wherein information security rules include rules specified by a user.

43. The method of claim 1 wherein information security rules include rules defined by automatic evaluation of data fields.

* * * * *